(12) United States Patent
Lottermann et al.

(10) Patent No.: US 10,979,478 B2
(45) Date of Patent: Apr. 13, 2021

(54) METHOD AND APPARATUSES FOR MONITORING OR SETTING QUALITY OF SERVICE FOR A DATA TRANSMISSION VIA A DATA CONNECTION IN A RADIO NETWORK

(71) Applicant: Bayerische Motoren Werke Aktiengesellschaft, Munich (DE)

(72) Inventors: Christian Lottermann, Munich (DE); Levent-Yusuf Ekiz, Munich (DE); Oliver Klemp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 442 days.

(21) Appl. No.: 14/794,050

(22) Filed: Jul. 8, 2015

(65) Prior Publication Data

US 2016/0014185 A1    Jan. 14, 2016

(30) Foreign Application Priority Data

Jul. 9, 2014    (DE) ............... 10 2014 213 304.1

(51) Int. Cl.
*H04L 29/06* (2006.01)
*H04W 28/24* (2009.01)
*H04W 72/12* (2009.01)

(52) U.S. Cl.
CPC .......... *H04L 65/80* (2013.01); *H04L 65/4092* (2013.01); *H04W 28/24* (2013.01); *H04W 72/1231* (2013.01); *H04W 72/1236* (2013.01)

(58) Field of Classification Search
CPC ..... H04L 65/80; H04L 65/4092; H04L 47/25; H04L 41/0896; H04W 28/24; H04W 72/1231; H04W 72/1236; H04W 28/20
See application file for complete search history.

(56) References Cited

U.S. PATENT DOCUMENTS

| | | | |
|---|---|---|---|
| 6,404,738 B1* | 6/2002 | Reininger | H04L 12/5602 370/236 |
| 8,914,012 B2* | 12/2014 | Crosbie | B60K 37/06 455/418 |
| 9,088,768 B1* | 7/2015 | Bordner-Babayigit | H04L 41/142 |
| 2012/0281536 A1* | 11/2012 | Gell | H04W 28/18 370/235 |

(Continued)

FOREIGN PATENT DOCUMENTS

DE    698 30 625 T2    5/2006

OTHER PUBLICATIONS

German Search Report dated Nov. 14, 2014, with English translation (Fifteen (15) pages).

*Primary Examiner* — Brian Whipple
*Assistant Examiner* — James Ross Hollister
(74) *Attorney, Agent, or Firm* — Crowell & Moring LLP

(57) ABSTRACT

A method and an apparatus are provided for monitoring or setting a quality of service for a data transmission via a data connection formed between at least one application and a transmission/reception device connected to the mobile communication device by way of at least one radio channel. The quality of service is established via setting a connection capacity and/or a data transmission mode such that an appropriate user satisfaction value corresponds at least to a minimum threshold. The quality of service can also be set in accordance with the utilization level of the corresponding radio network.

16 Claims, 6 Drawing Sheets

(56) References Cited

U.S. PATENT DOCUMENTS

| | | | | |
|---|---|---|---|---|
| 2013/0041998 A1* | 2/2013 | Kordasiewicz | H04N 21/44004 | 709/224 |
| 2013/0219048 A1* | 8/2013 | Arvidsson | H04L 41/5025 | 709/224 |
| 2013/0290492 A1* | 10/2013 | ElArabawy | H04L 47/2416 | 709/219 |
| 2014/0122594 A1* | 5/2014 | Uzunalioglu | H04L 41/5067 | 709/204 |
| 2014/0179238 A1* | 6/2014 | Wynn | H04W 24/02 | 455/67.11 |
| 2014/0226571 A1* | 8/2014 | Das | H04L 47/14 | 370/329 |
| 2014/0229210 A1* | 8/2014 | Sharifian | G06Q 10/0631 | 705/7.12 |
| 2015/0124607 A1* | 5/2015 | Kotecha | H04W 72/1242 | 370/235 |
| 2016/0254959 A1* | 9/2016 | Arndt | H04L 41/0896 | 370/235 |

\* cited by examiner

| FK | DV | ZD | BB | FR | LT | DK |
|---|---|---|---|---|---|---|
| 1 | A | 1000 | 8000 | 3 | 1 | 0.01 |
| 1 | C | 7000 | 8000 | 3 | 1 | 0.01 |
| 2 | B | 3500 | 6000 | 2 | 2 | 0.1 |
| 2 | C | 2500 | 6000 | 2 | 2 | 0.1 |
| 3 | C | 2000 | 2000 | 1 | 3 | 0.05 |
| 4 | D | 5000 | 10000 | 6 | 8 | 0 |
| 4 | - | 5000 | 10000 | 6 | 8 | 0 |

FIG. 2A

| APP | DV | GD | KL | MIN | OPT | MFR | MLT | QOE | MOS |
|---|---|---|---|---|---|---|---|---|---|
| W | A | 1000 | 2 | 1000 | 1000 | 3 | 2 | - | - |
| X | B | 3500 | 3 | 3000 | 3500 | 2 | 2 | Q1 | 3.8 |
| Y | C | 11500 | 3 | 10000 | 12000 | 5 | 5 | Q2 | 4.5 |
| Z | D | 5000 | 4 | 1000 | 5000 | 8 | 10 | - | - |

FIG. 2B

METHOD AND APPARATUSES FOR MONITORING OR SETTING QUALITY OF SERVICE FOR A DATA TRANSMISSION VIA A DATA CONNECTION IN A RADIO NETWORK

CROSS REFERENCE TO RELATED APPLICATION

This application claims priority under 35 U.S.C. § 119 from German Patent Application No. 10 2014 213 304.1, filed Jul. 9, 2014, the entire disclosure of which is herein expressly incorporated by reference.

BACKGROUND AND SUMMARY OF THE INVENTION

The present invention relates to methods and apparatuses for monitoring or setting a quality of service for a data transmission via a data connection in a radio network.

For motor vehicles, telecommunication modules have been developed that are also referred to as central communication units. Such a unit has a plurality of connecting modules that can each set up and maintain a radio channel to external communication partners in accordance with one or more predetermined radio standards. A plurality of appliances that are arranged in the motor vehicle and use a data connection to an external communication partner are connected to the central communication unit via a data network.

Applications that are executed on the individual appliances receive data, such as audio streaming data, video streaming data, traffic messages, navigation data, etc., from an external server that is connected to the motor vehicle by the central communication unit. For the individual applications, particular transmission modes and data rates are stipulated in the central communication unit. For example, video streaming data require a much higher connection capacity than traffic information data. This system has proved itself to a great extent per se, since appropriate data connections are set up between the central communication unit and the external communication partners for the different requirements of the different applications. Owing to the principles involved, a motor vehicle is subject to considerable fluctuations in the quality and availability of radio networks, however. When driving a motor vehicle through an urban area, there is thus often briefly an unrestricted W-LAN available that can be used to transmit data at a high data rate and at no cost. Otherwise, other radio networks, such as GSM, GPRS, EDGE, 3G/UMTS, HSPA, are used in order to set up the corresponding data connections. The connection capacities, availability and costs of the individual radio standards are very different. Accordingly, the available radio network often changes when driving a motor vehicle on an arbitrary route.

If a radio system contains many users simultaneously, the transmission of the data may be adversely affected, which means that the quality of reproduction of the data by individual users is adversely affected. This arises primarily when many users with data-intensive applications, such as audio streaming, use a particular radio network.

ITU P.800 SERIES P: "TELEPHONE TRANSMISSION QUALITY Methods for objective and subjective assessment of quality" (08/96) from the International Telecommunications Union defines a mean opinion score as a value that is used to assess the quality of voice transmission services. The mean opinion score is ascertained by empirical methods and is the arithmetic mean of individual subjective ratings from test subjects or users. It is the result of a stipulated sequence of a plurality of tests in which the subjectively perceived quality of the voice is assessed by a group of test subjects. The result of the test series is classified on a five-level quality scale in a range from 1 (worst value; no satisfaction) to 5 (best value; maximum satisfaction) (see ITU P.800, page 18). There is also a similar standard for video services (e.g. ITU-R BT1788 or BT500).

The present invention is based on the object of providing a method and an apparatus that allow data to be used reliably with the best possible quality with a mobile radio device.

This and other objects are achieved by methods and apparatuses according to embodiments of the invention.

According to a first aspect of the present invention, a method for monitoring a quality of service for a data transmission via a data connection is provided. The data connection is formed between at least one application, which can be executed on an appliance that is situated on a mobile communication device or connected thereto, and a transmission/reception device that is connected to the mobile communication device by way of at least one radio channel. The method is distinguished in that the value of a predetermined quality of service parameter for the data connection is recorded, a user satisfaction value is ascertained using an application-specific QoE model, which renders the user satisfaction on the basis of the quality of service parameter of the application, with the user satisfaction value being ascertained using the recorded value of the quality of service parameter, and a check being performed to determine whether the user satisfaction value is below a minimum user satisfaction threshold. If the user satisfaction value is below the minimum user satisfaction threshold, a data transmission mode and/or a connection capacity of the data connection of the application is changed such that a user satisfaction value is attained that corresponds at least to the minimum user satisfaction threshold, and, if this is not possible, the corresponding application is terminated.

The user satisfaction value, which is also referred to as an MOS value, indicates the quality of service of a data transmission via a data connection. This method is used to record the quality of service of a data connection of a particular application and to compare it with a user satisfaction value. If the ascertained user satisfaction value is below a predetermined user satisfaction threshold, the data transmission mode and/or the connection capacity is changed such that there is a sufficient quality of service, that is to say that the new user satisfaction value is at least the user satisfaction threshold. If this is not possible, the application is terminated.

This method takes account of the QoE model of the respective application, so that the transmission mode and/or the connection capacity of the data connection of this application is set such that the user can receive the desired data via the data connection with a quality that is sufficient for him. If the appropriate quality cannot be ensured, the application is terminated, which means that connection capacity is freed and can be used by other users in the radio network. This avoids the operation of applications when it makes little sense owing to a higher load situation and merely adds additional load to the radio network. This benefits the further applications in the radio network that can be operated using a transmission mode that fulfills the desired quality of service and/or using a suitable connection capacity.

The quality of service parameters are primarily transmission parameters that influence the connection capacity, such as the data rate, latency and/or the error rate of the data connection. The QoE model indicates user satisfaction on the basis of at least one of these quality of service parameters. However, it is also possible for the QoE model to describe user satisfaction on the basis of two or more quality of service parameters.

The recording of the value of a prescribed quality of service parameter can be carried out at regular intervals independently of the ascertainment of the user satisfaction value. When ascertaining the user satisfaction value, the most recently recorded value of the quality of service parameter is then used. Both the quality of service parameter and the corresponding user satisfaction value can be stored and kept in the system, so that they merely need to be read when required.

By way of example, the change in the data transmission mode comprises a change in a video codec or in a compression parameter, such as a quantization parameter, a frame rate and/or a resolution, for a video transmission, a source data rate or bit rate for an audio stream transmission, a voice codec for a telephone call transmission or a compression rate for a file transmission. The method can be carried out in a mobile radio device. The mobile radio device is preferably, but not necessarily, part of a motor vehicle. The method can also be carried out in a radio system control server that is connected to one or more mobile radio devices via a radio network. When the method according to the invention is carried out centrally on a radio system control server, central application-specific setting of the quality of service of the individual applications is performed. In this case, the quality of service of all dynamic applications with a QoE model that are active in the respective radio network is monitored and if need be corrected. In addition, it is also possible for the connection capacities of these and further, particularly all, applications to be controlled centrally.

According to a second aspect of the present invention, a method for setting a quality of service for a data transmission via a data connection in a radio network is provided, wherein the data connection is formed between at least one application, which can be executed on an appliance that is situated on a mobile communication device, and a transmission/reception device that is connected to the mobile communication device by way of at least one radio channel. This method is distinguished in that the utilization level of the radio network is recorded and the recorded utilization level of the radio network is taken as a basis for determining a transmission mode and/or a data connection capacity for the data connection of the application, with an application-specific QoE model being taken into account. In this case, the transmission mode and/or the connection capacity are determined such that a resultant user satisfaction value corresponds at least to a minimum user satisfaction threshold, and, if this is not possible, the connection capacity is set to "0" in order to terminate the application. The transmission mode and/or the connection capacity is transmitted to the mobile communication device for appropriate setting of the data connection.

The setting of the transmission mode and/or the connection capacity taking account of the QoE model on the basis of the recorded utilization level of the radio network attains individual setting of the operating point or the operating range of the individual applications, with the overall load situation in the radio network being taken into account. This ensures that the application is carried out with a quality of service that is sufficient for the respective user. If this is not possible, the corresponding application needs to be terminated. The utilization level of the radio network is simple to establish and this parameter is present on the radio system control servers and can be requested simply. This provides a simple way of setting a multiplicity of dynamic applications with a QoE model to a quality of service quality that is suitable for the user or desired by the user. If the respective application cannot be operated with the sufficient quality of service, it is terminated and the connection capacity that is freed as a result can be used by other applications.

Preferably, when the data transmission mode and/or the connection capacity is/are changed or set, it is changed or set such that the user satisfaction is in the range between the minimum user satisfaction threshold and an optimum user satisfaction value.

This preferred refinement of the method applies both to the first aspect and to the second aspect of the present invention. As a result, the data transmission mode and/or the connection capacity is changed or set such that firstly the user can receive the data with the desired quality and secondly more connection capacity than is necessary to achieve an optimum user satisfaction value is not used. This ensures that connection capacity is not used unnecessarily by particular applications and there is thus sufficient connection capacity available for further applications. The individual dynamic applications with a QoE model are therefore operated at the operating point or in the operating range that satisfies the user and secondly keeps down the need for connection capacity. As a result, it is possible to operate a multiplicity of applications with good quality in a radio network.

If the total connection capacity is not sufficient to operate all applications with the optimum user satisfaction value, the connection capacities between the applications are preferably distributed such that the user satisfaction values of all applications are approximately at a uniform distance from the respective minimum user satisfaction threshold and the optimum user satisfaction value. As a result, the additional "user satisfaction" that is available above the minimum user satisfaction threshold is uniformly distributed over the respective applications. This distribution of the connection capacities or the user satisfaction can also be effected in a manner weighted in accordance with the priorities of the applications.

Preferably, a total connection capacity between the central communication device and the transmission/reception devices or the total connection capacity in the radio network is distributed over the individual applications, with the transmission modes and/or connection capacities of the individual data connections of the dynamic applications with a QoE model being set such that the user satisfaction value of each data connection is above the respective minimum user satisfaction threshold, and, if this is not possible, one or more applications are terminated. This method involves the connection capacity being distributed between all applications, these also including static and dynamic applications without a QoE model. The distribution of the connection capacity for the applications with a QoE model is effected taking account of the respective QoE model. Static applications are assigned a respective prescribed connection capacity and dynamic applications are assigned a suitable connection capacity that is in the range between the respective minimum and optimum connection capacities. If applications need to be terminated, then this is preferably accomplished taking account of the priorities. In this case, static and dynamic applications with and without a QoE model can be terminated in equal measure.

A central communication unit of a mobile communication device includes a plurality of connecting modules for setting up a wireless data connection between the mobile communication device and at least one transmission/reception device, a connecting module manager for controlling the connecting modules in order to provide a suitable data connection between the mobile communication device and the at least one transmission/reception device, and a data network in order to connect a plurality of appliances within the mobile radio device. A plurality of applications that can be executed on the appliances each is able to use a data connection via the central communication unit to the transmission/reception device. This central communication unit is distinguished by a communication organization module that is designed to carry out one of the methods explained above.

A radio communication system for mobile radio devices includes a radio system for providing one or more radio channels between a transmission/reception device, which is connected to a radio system control server, and one or more mobile radio devices that each have a communication unit. The radio communication system is distinguished in that the radio system control server is designed to carry out one of the methods explained above.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2A is a representation of a connection register of a mobile radio device;

FIG. 2B is a representation of an application profile register of a mobile radio device;

DETAILED DESCRIPTION OF THE DRAWINGS

Figure 1:
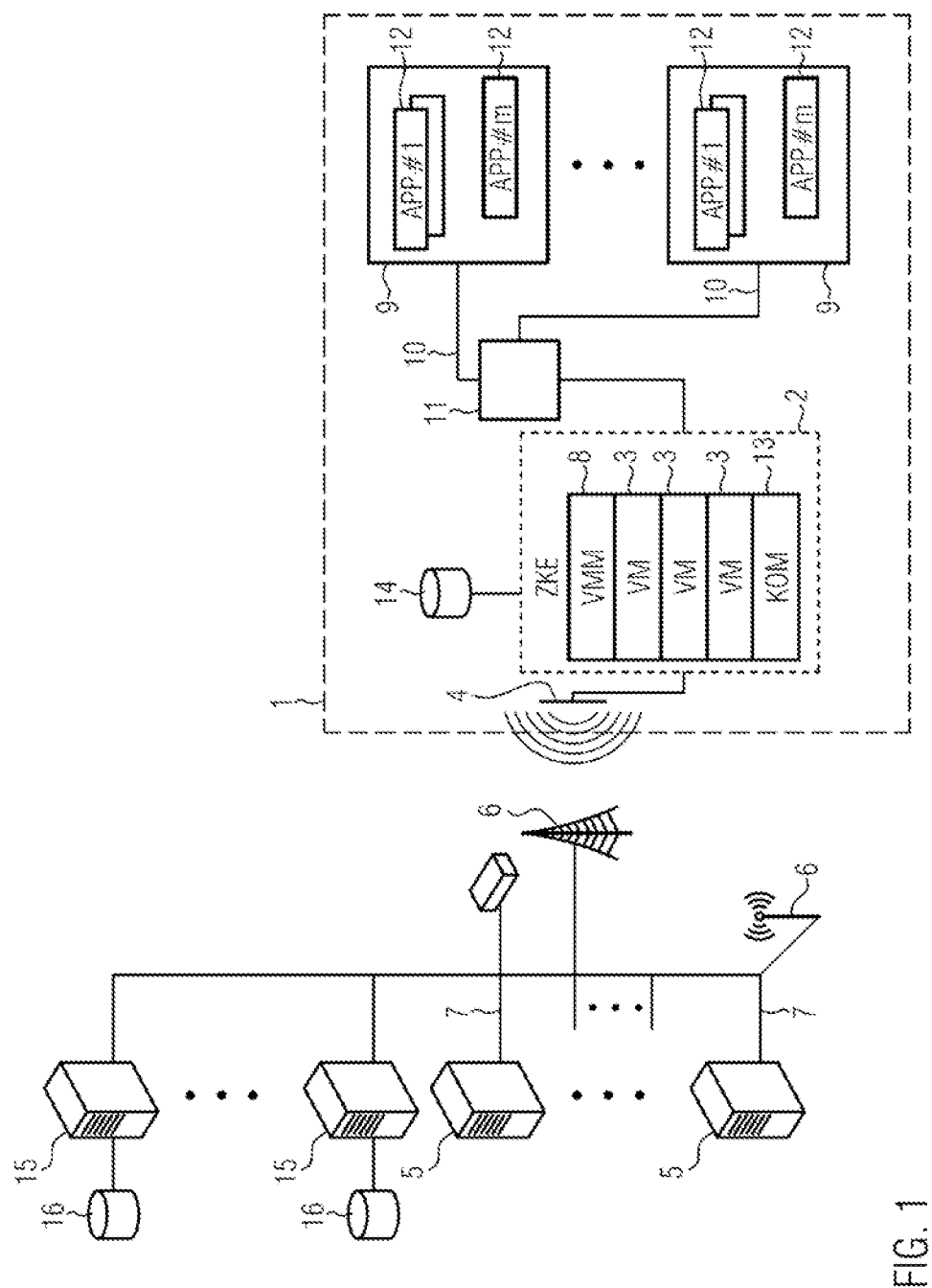
FIG. 1 is a schematic diagram showing a mobile radio device having a plurality of components.

A first exemplary embodiment of an apparatus according to an embodiment of the invention for monitoring or setting a quality of service for a data transmission via a data connection (FIG. 1) has a mobile radio device 1 having a central communication unit 2 (ZKE). The central communication unit 2 includes a plurality of connecting modules 3 (VM). Each connecting module 3 is connected to an antenna 4 that can be used to send and receive radio signals.

The mobile radio device 1 is preferably part of a motor vehicle.

Each connecting module 3 can set up and maintain a radio channel to external communication partners 5 via transmission/reception devices 6 in accordance with one or more predetermined radio standards.

The connection capacity is the available capacity for the transmission of data via one of the radio channels between the mobile radio device 1 and the corresponding transmission/reception device 6. In the present exemplary embodiment, the connection capacity is represented by the data rate. The connection capacity can also be influenced by the error rate and/or latency of the radio channel.

The external communication partners 5 are normally servers that are connected to the transmission/reception devices 6 via a data network 7, particularly the Internet. The external communication partners 5 may also be natural persons who are connected to corresponding transmission/reception devices 6 by means of telephones via telephone lines (data network 7).

The connecting modules 3 are designed to communicate using the following radio standards or radio systems, for example: GSM, GPRS, EDGE, 3G/UMTS, HSPA, 4G/LTE, ETSI ITS-G5 and/or WLAN (IEEE802.11a, IEEE802.11b, IEEE802.11ac, IEEE802.11ad, IEEE802.11g, IEEE802.11h, IEEE802.11n, IEEE802.11p). Each connecting module 3 can be used to operate at least one radio channel, which means that the provision of a plurality of connecting modules 3 allows a plurality of radio channels to be operated simultaneously, these also being able to correspond to different standards, such as in the case of MIMO (Multiple Input Multiple Output).

These radio standards are all used for far field communication. The connecting modules 3 are normally not designed for a near field radio standard, such as BLUETOOTH.

The central communication unit 2 has a connecting module manager 8 (VMM) that controls the individual connecting modules 3 that monitor the radio channels between the central communication unit 2 and the external transmission/reception devices 6. This control is effective on the basis of predetermined criteria, particularly on the basis of the availability of the individual radio channels, the available bandwidth or the available data rate, the costs, the latency and the error rate. If only a small bandwidth is needed and a zero-cost radio channel with sufficient bandwidth is available, then the latter is used, for example, whereas when there is a need for a greater bandwidth a radio channel that possibly incurs a cost but that has sufficient bandwidth is used. Additionally, the control can be effected on the basis of a distribution parameter, which is described in more detail below.

When assigning the connection capacity to a data connection, the connecting module manager 8 takes account of the data costs of the respective radio channels. Data costs may be the financial costs that need to be paid for the transmission of the data. However, data costs may also be nonfinancial costs that are used to rate the different radio channels. Radio channels with high costs are considered to a lesser degree than radio channels with low costs. Hence, the connecting module manager 8 additionally minimizes the transmission costs.

A data connection is a logical connection that can be used to transmit data via the radio channels that are in place. An active data connection is associated with at least one radio channel and proportionally uses the connection capacity thereof or the total connection capacity thereof. A data connection can also use two or more radio channels simultaneously.

The connecting module manager 8 has a connection register that the connecting module manager 8 uses to store one or more parameters that are characteristic of the data transmission via the radio channels (FIG. 2A). By way of example, these parameters include an identification descriptor for the radio channel (FK), an identification descriptor for the data connection, in order to assign the latter to a radio channel (DV), the data rate in kbit/s that is assigned to the data transmission via the radio channel (ZD), the current bandwidth or data rate of the radio channel in kbit/s (BB), the current error rate of the radio channel in kbit/s (FR), the current latency of the radio channel in ms (LT), the volume-dependent data transmission costs of the radio channel (DK) in ct/Mbit.

The respective connecting module 3 cyclically looks for new radio channels in the corresponding standard or radio system and reports newly found radio channels with their parameters onward to the connecting module manager 8. Similarly, it reports a loss of a radio connection or a change in the parameters to the latter.

The connecting module manager 8 uses a periodically performed update for the values in the connection register to ensure that the current values are entered in the connection register at all times.

A plurality of appliances 9 are connected to the central communication unit 2 via a data network 10. In the present exemplary embodiment, the data network 10 is Ethernet. The data network 10 can have one or more switches 11 for branching the data network. Each appliance 9 has at least one application 12 provided on it that, during operation, requires a logical data connection via the central communication unit 2 to an external transmission/reception device 6. The applications 12 are of dynamic or static type, with dynamic applications 12 being able to be operated with variable connection capacity within predetermined limits, i.e. in a range between a minimum and an optimum connection capacity. In the case of dynamic applications 12, a distinction is drawn between dynamic applications 12 without and with an associated QoE model, which is explained in more detail below. In contrast to dynamic applications 12, static applications 12 cannot variably adjust their connection capacity that is used, but rather have to be operated with a predetermined, stipulated connection capacity. In order to be able to transmit data, a data connection is set up or assigned for an application 12. An application 12 may also have a plurality of associated logical data connections.

Figure 3:
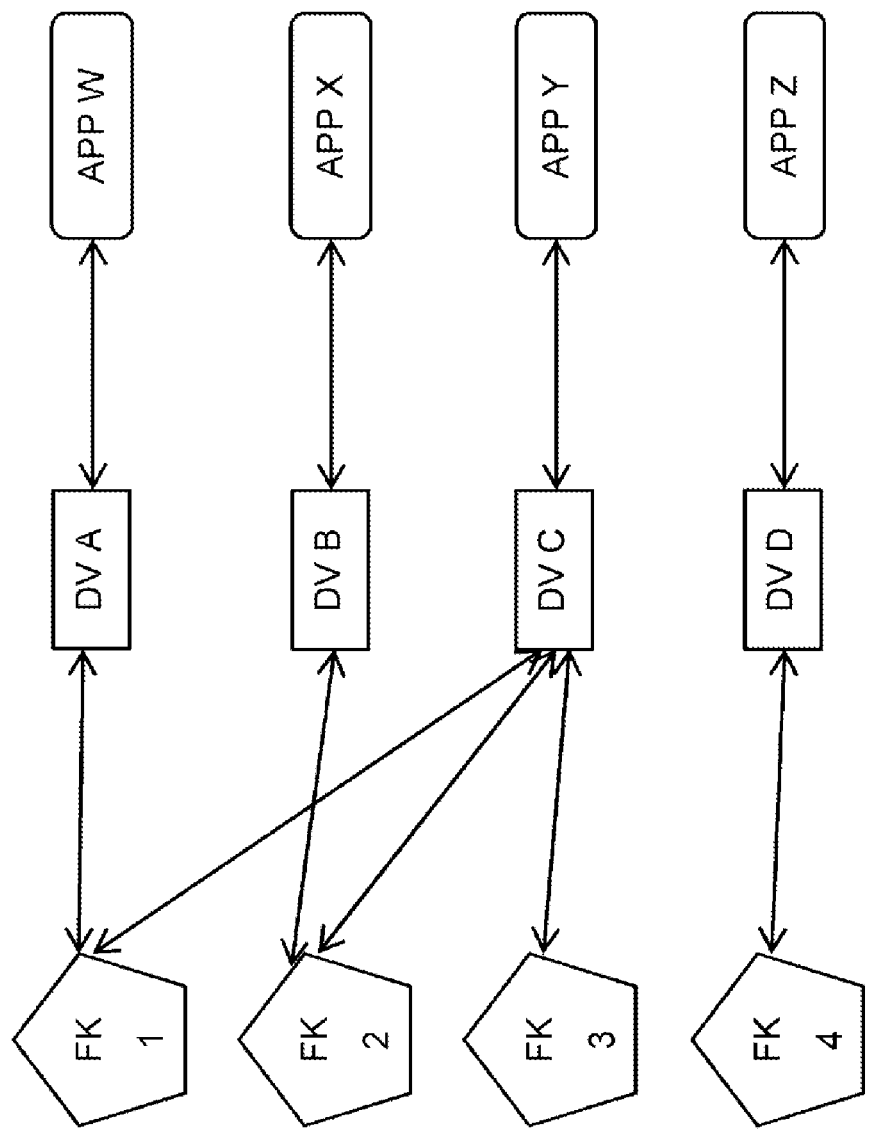
FIG. 3 is a schematic diagram showing an association between various radio channels and various data connections.

Associations of (logical) data connections with radio channels and with applications are shown schematically and by way of example in FIG. 3, the arrows showing the respective association. Various data connections (DV) A, B, C and D are associated with various radio channels (FK) FK 1, FK 2, FK 3 and FK 4. The same data connections have the associated applications (APP) W, X, Y and Z. A data connection is associated with at least one radio channel but may also be associated with a plurality of radio channels, such as data connection DVC, which is associated with the radio channels FK 1, FK 2 and FK 3. A radio channel may also have one or more associated data connections, with a data connection that is associated with a radio channel using a particular proportion of the connection capacity of this radio channel. By way of example, the radio channel FK 1 has two associated data connections DV A and DV C. In the schematic representation in FIG. 3, the applications each have one associated data connection. An application may also have a plurality of associated data connections, however.

The central communication unit 2 has a communication organization module 13 (KOM) that, in cooperation with the connecting module manager 8, distributes the available external connection capacities between the central communication unit 2 and the external transmission/reception devices 6 over individual active data connections of the applications 12 in accordance with predetermined criteria and monitors the quality of service of the applications 12. The communication organization module 13 is connected to an internal data memory 14.

The communication organization module 13 has an application profile register that the communication organization module 13 uses to store one or more parameters, relating to the data transmission, of the respective static and/or dynamic applications 12 (FIG. 2B). By way of example, these parameters include an identification descriptor for the application 12 (APP), an identification descriptor for the data connection, in order to assign the latter to the respective application 12 (DV), the data rate in kbit/s that is currently granted to the application 12 via the associated data connection (GD), the application class or priority of the application 12 (KL), the minimum data rate of the data transmission of the application 12 in kbit/s (MIN), the optimum data rate of the data transmission of the application 12 in kbit/s (OPT), the maximum error rate of the data transmission of the application 12 in kbit/s (MFR), the maximum latency of the data transmission of the application 12 (MLT), an identification descriptor for a QoE model associated with the application 12 (QOE), a current mean opinion score for the application 12 (MOS). The mean opinion score is a user satisfaction value, which is explained in more detail below.

On the basis of the entered values in the connection register (FIG. 2A) and the entered values in the application profile register (FIG. 2B), the associations explained above in connection with FIG. 3 between the radio channels, data connections and applications 12 are obtained.

The applications 12 use the data connections and the external transmission/reception device 6 to communicate with the external communication partners 5. The communication partners 5 are connected to the transmission/reception device 6 via the data network 7. The data network 7 contains at least one radio system control server 15 that controls the respective radio system. The radio system control server 15 cyclically checks whether the mobile radio devices 1 connected to it are still within radio range. As a result, the radio system control server 15 is informed about the number of mobile radio devices 1 that are within its radio range and about the radio channel use of the devices. The radio system control server 15 can record the connection capacities used on the individual radio channels and compute the utilization level of the radio network. This information can be used to monitor or set qualities of service for the individual data connections and to distribute the connection capacities, as explained in more detail below. The radio system control servers 15 store the relevant data in the radio system control memory 16, so that the data can be made available to the relevant mobile radio devices 1 when needed.

The communication organization module 13 monitors the quality of service of a data transmission via a data connection. The communication module can also distribute the connection capacities between the individual active data connections of the applications 12 in accordance with predetermined criteria. These criteria are primarily the priority or application class of an application 12, the type of application 12 (static, dynamic with or without a QoE model) and/or the need for connection capacity in the different applications 12. In the case of dynamic applications 12 with a QoE model, the QoE model is taken into account when distributing the connection capacity, as explained in more detail below.

The priority may be stipulated explicitly by relevant specifications. However, the priority may be obtained implicitly on the basis of the application classes, for example. A typical split for the application classes can have the following appearance:

1st class: emergency call;
2nd class: traffic messages;
3rd class: telephony, VOIP and streaming of audio and/or video files, such as radio streaming, music streaming or video streaming;
4th class: ftp applications and web pages.

The individual classes are sorted according to their priority, with the 1st class having the highest priority and the 4th class having the lowest priority.

The communication organization module 13 takes the application classes that are present as a basis for deciding which data connection has a higher priority and which data connection has a lower priority. The communication organization module 13 distributes the total available connection capacity according to the priority of the respective application 12.

In principle, however, the connection capacity can also be distributed according to other criteria, such as in a random order of the applications 12, in the order of the connection capacity used or requested by the applications 12 and/or in the order of the data rates, latencies and/or error rates of the connection capacity.

In the event of bottlenecks in connection capacities, the communication organization module 13 reduces the corresponding connection capacities for data connections with low priority by granting a lower data rate for an associated dynamic application 12 or terminating an associated dynamic or static application 12.

Figure 4A:
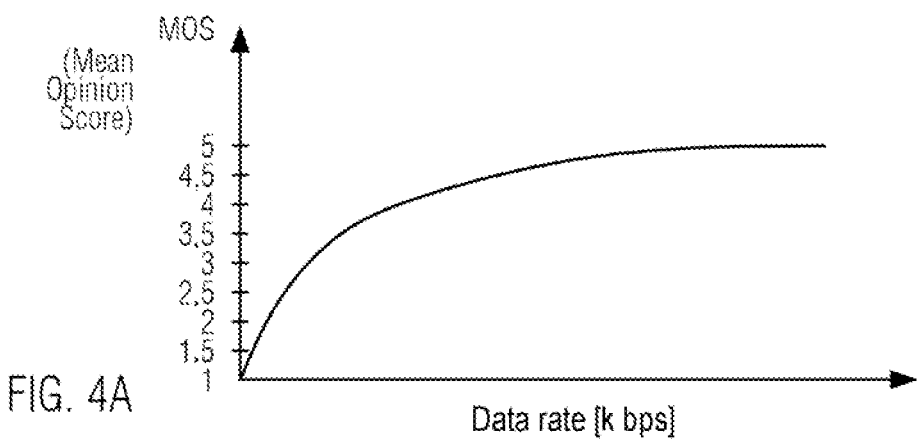
FIGS. 4A, 4B and 4C are graphical representations of quality of experience profiles.
Figure 4B:
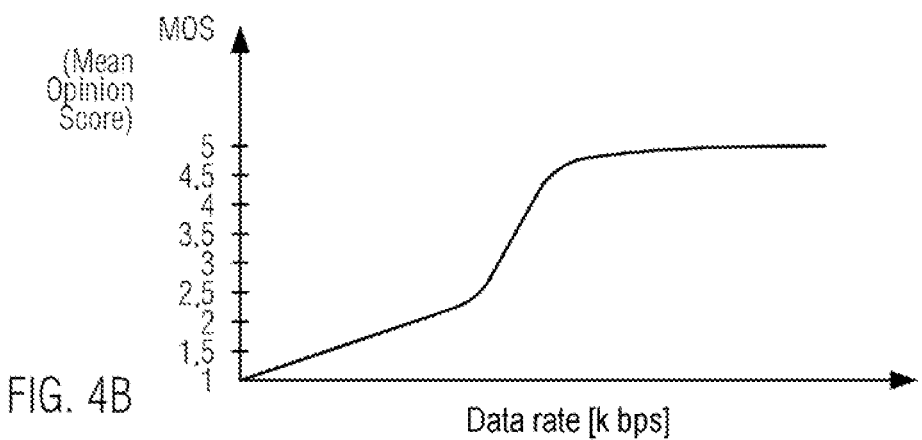
Figure 4C:
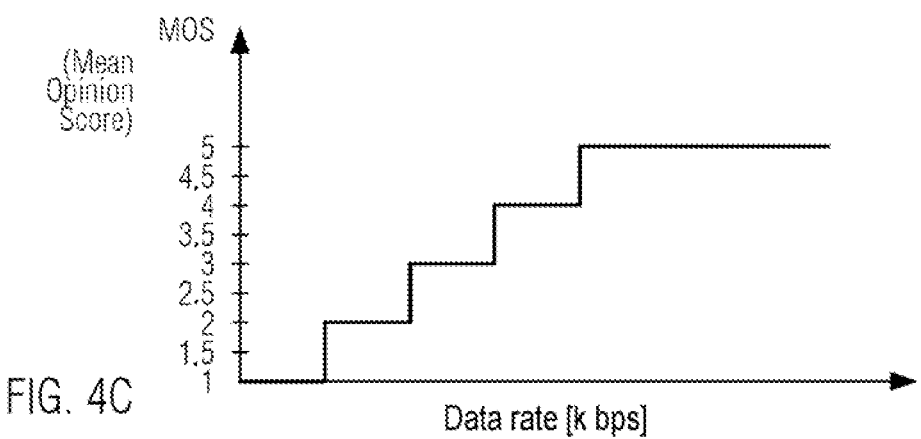

The internal data memory 14 stores the quality of experience profiles or QoE models that can be read by the communication organization module 13 (FIGS. 4A, 4B, 4C). Dynamic applications 12 may have one of the QoE models associated with them. The QoE model basically renders a user satisfaction value (mean opinion score; MOS value) on the basis of at least one quality of service parameter of the respective application 12 or of the code used in the respective application 12. In the present exemplary embodiment, the quality of service parameter used is a connection capacity characterized by the data rate, as a result of which the QoE model is a function of the MOS value on the basis of the connection capacity.

Examples of QoE models for which the MOS value is plotted against the value of the data rate are shown in FIGS. 4A, 4B and 4C. The MOS value is plotted on the vertical axis or ordinate axis and the data rate in kbit/s is plotted on the horizontal axis or abscissa axis.

These QoE models are typical of the streaming of audio or video files, since in this case user satisfaction is essentially dependent on the connection capacity, particularly the data rate. In the case of other applications, in which small volumes of data are requested, such as in the case of weather queries, latency is of much greater significance. In this case, a quality of service parameter that is characterized essentially by the latency is used.

In telecommunication, the MOS value is a usual standard for assessing the quality of voice transmission services. The MOS value is the arithmetic mean of individual subjective ratings from test subjects or users. The result of the ratings is classified on a five-level quality scale in a range from 1 (worst value; no satisfaction) to 5 (best value; maximum satisfaction) (see ITU P.800 SERIES P: "TELEPHONE TRANSMISSION QUALITY Methods for objective and subjective assessment of quality" (08/96) from the International Telecommunications Union, page 18).

The communication module 13 basically distributes the connection capacities between the individual data connections. When there is a change, for example by virtue of an application registering a new need for connection capacity or deregistering, or the total connection capacity or the connection capacity of one or more radio channels changing, the connection capacities are redistributed between the individual data connections by the communication module. The respective connecting module 3 establishes a change in the connection capacity and reports this change to the connecting module manager 8. The connecting module manager 8 forwards this information to the communication organization module 13, which carries out redistribution of the connection capacities between the respective applications 12. According to the invention, this involves the qualities of service of the data transmission via the available data connections being monitored. The monitoring of the qualities of service does not necessarily have to be accompanied by redistribution of the connection capacities, but rather can also be performed at regular intervals of time, for example, with coupling to the redistribution of the connection capacities being expedient, however.

Monitoring basically involves at least one predetermined quality of service parameter being recorded and the recorded quality of service parameter being taken as a basis for determining a user satisfaction value using a QoE model. If the user satisfaction value is below a minimum user satisfaction threshold, a data transmission mode and/or the connection capacity of the data connection is changed such that the user satisfaction value corresponds at least to the minimum user satisfaction threshold. If this is not possible, the corresponding application is terminated.

In the present exemplary embodiment, the quality of service parameter used is the data rate of the data connections. The data rate GD is read from the application profile register (FIG. 2B).

The recorded data rate is used to ascertain the user satisfaction value or MOS value for every existing data connection of all the dynamic applications with a QoE model by applying the recorded quality of service parameter to the relevant application-specific QoE model. The MOS values can also be continually updated and stored in the application profile register (FIG. 2B), as a result of which the recording of the quality of service parameter and the ascertainment of the relevant MOS value can be carried out by reading the relevant MOS value from the application profile register (FIG. 2B).

The user satisfaction value or MOS value ascertained in this manner is checked to determine whether it meets the desired quality demands. This primarily involves checking whether the MOS value is below a predetermined minimum user satisfaction threshold. If this is the case, the data transmission mode and/or the connection capacity are changed. If this is not possible, the corresponding application 12 is terminated.

Adjustment of the data transmission mode can be carried out by selecting a CODEC, for example, that, at a lower data rate, allows a sufficient user satisfaction value. Although a CODEC that is more demanding in terms of the data rate allows a better quality to be achieved overall, if the available data rate is limited then it is necessary to change over to a CODEC that is less demanding in terms of data rate. When streaming audio or video files, quantization parameters, the resolution and/or frame rate can be adjusted (e.g. H.264/SVC, http DASH). These adjustments of the transmission mode can be used to influence the user satisfaction value or MOS value without changing the connection capacity, particularly the data rate.

If connection capacity is free, however, then the relevant data connection of the application 12 is assigned sufficient connection capacity, so that the MOS value is no longer below the predetermined threshold value. Free connection capacity may be unused connection capacity or connection capacity used by a dynamic application 12, this dynamic application 12 also being able to be operated satisfactorily with a lower connection capacity.

The monitoring of the quality of service is preferably carried out in conjunction with the distribution of the connection capacities of the individual data connections for a plurality of applications 12. To this end, a total need for connection capacity is first of all ascertained. The minimum and optimum total need for connection capacity in all the applications 12 can be computed using the following formulae:

$$Vk_{minimal} = \sum_{p=1}^{Kl} \left( \sum_{i=0}^{x_p} Vk(s_{i,p}) + \sum_{j=0}^{y_p} Vk_{MOS\ min}(q_{j,p}) + \sum_{k=0}^{z_p} Vk_{min}(d_{k,p}) \right) \quad [1]$$

and $$Vk_{opttotal} = \sum_{p=1}^{Kl} \left( \sum_{i=0}^{x_p} Vk(s_{i,p}) + \sum_{j=0}^{y_p} Vk_{MOS\ opt}(q_{j,p}) + \sum_{k=0}^{z_p} Vk_{opt}(d_{k,p}) \right) \quad [2]$$

where Vk a is a connection capacity in kbit/s,

Kl is the number of priority or application classes, p is a running index for the priority or application class (class), in this case between 1 and 4, for example, $x_p$ is the number of static applications 12 in class p, $y_p$ is the number of dynamic applications 12 with QoE models in class p, $z_p$ is the number of dynamic applications 12 without a QoE model in class p, $s_{i,p}$ is the static application 12 with index i in class p, $q_{j,p}$ is the dynamic application 12 with a QoE model with index j in class p, $d_{k,p}$ is the dynamic application 12 without a QoE model with index k in class p, and $Vk_{MOSmin}(q_{j,p})$ or $Vk_{MOSopt}(q_{j,p})$ is the connection capacity of the dynamic application 12 with a QoE model with index j in the class p for a given minimum or optimum user satisfaction threshold (min or opt. MOS value), $Vk(s_{0,p}) = Vk_{MOSmin}(q_{0,p}) = Vk_{MOSopt}(q_{0,p}) = Vk_{max}(d_{0,p}) = 0$ (wildcard for an application class that contains no application).

The formulae indicated above can be used to compute the minimum ($Vk_{mintotal}$) and optimum ($V_{koptotal}$) connection capacities for all the applications 12 that wish to transmit data. The respective outer sum in the formulae sums the connection capacities appearing in parentheses for the applications 12 over the priority or application classes Kl with running index p. First of all, the connection capacities of the applications 12 in the 1$^{st}$ application class or in the class with the highest priority are summed and then the connection capacities of the respective next priority or application classes through to the 5$^{th}$ application class are summed in steps. In the present exemplary embodiment, the 5$^{th}$ application class is the class with the applications 12 that have the lowest priority.

The respective sums within the parentheses sum the connection capacities of the static applications 12 ($Vk(s_{i,p})$), of the dynamic applications 12 with the QoE model ($Vk_{MOSmin}(q_{j,p})$) or $Vk_{MOSmin}(q_{j,p})$ and of the dynamic applications 12 without a QoE model ($Vk_{min}(d_{k,p})$ or $Vk_{opt}(d_{k,p})$) in the class respectively determined by the parameter p of the outer sum. In this way, all the applications 12 are included in the computation.

The static applications 12 have a fixed value for their desired connection capacity, said value being stored in the application profile register (MIN or OPT).

The minimum connection capacity of dynamic applications 12 with a QoE model is prescribed by a minimum user satisfaction threshold and the relevant QoE model.

The dynamic applications 12 without a QoE model have a minimum value, corresponding to the minimum requirements of the application 12 for the data transmission, and an optimum value, corresponding to the optimum operation of the application 12 for the data transmission, for the desired connection capacity thereof. The minimum (MIN) and optimum (OPT) values are stored for dynamic applications 12 without a QoE model in the application profile register.

Should a priority or application class have no application 12 of the respective application type, the wildcards $Vk(s_{0,p})$ and $Vk_{MOSmin}(q_{0,p})$ and $Vk_{MOSopt}(q_{0,p})$ and $Vk_{min}(d_{0,p})$ and $Vk_{opt}(d_{0,p})$, which have the value zero, are used to obtain the result of the sum of the relevant application type 0.

The set or provided MOS value or user satisfaction value in the formulae indicated above is the same for all applications 12. However, it can be stipulated for each priority or application class individually or for each application 12 individually. The MOS value is predetermined or is dependent on further parameters, such as the available connection capacity, the total data rate, the mean latency and/or the transmission costs.

In order to be able to assign connection capacity to all the applications 12, it must be possible for at least the minimum need for connection capacity $Vk_{mintotal}$ to be covered by the total available connection capacity. If there is not sufficient connection capacity in place, applications 12 having the respective lowest priority are terminated in steps, so that the connection capacity that is freed as a result can be distributed to the other applications 12. This is repeated until either sufficient connection capacity has been assigned to all the applications 12 that are still active or all applications 12 have been terminated or deactivated.

When the need for the total optimum connection capacity $Vk_{opttotal}$ is covered, the respective optimum connection capacity is assigned to all applications 12.

If the total available connection capacity is in the range between the total minimum connection capacity Vk-mintotal and the optimum connection capacity $Vk_{opttotal}$ the connection capacity that goes beyond the minimum connection capacity a $Vk_{mintotal}$ is distributed approximately uniformly to the respective applications 12. This uniform distribution can be carried out such that all the applications 12 are assigned a proportion of connection capacity that brings about the same improvement for the MOS value in each case. The uniform distribution may also be weighted using the priorities. It is also possible for all applications 12 to be assigned the same proportion of connection capacity.

Various exemplary embodiments of methods according to the invention that are carried out on the radio system explained above will be explained below.

Figure 5:
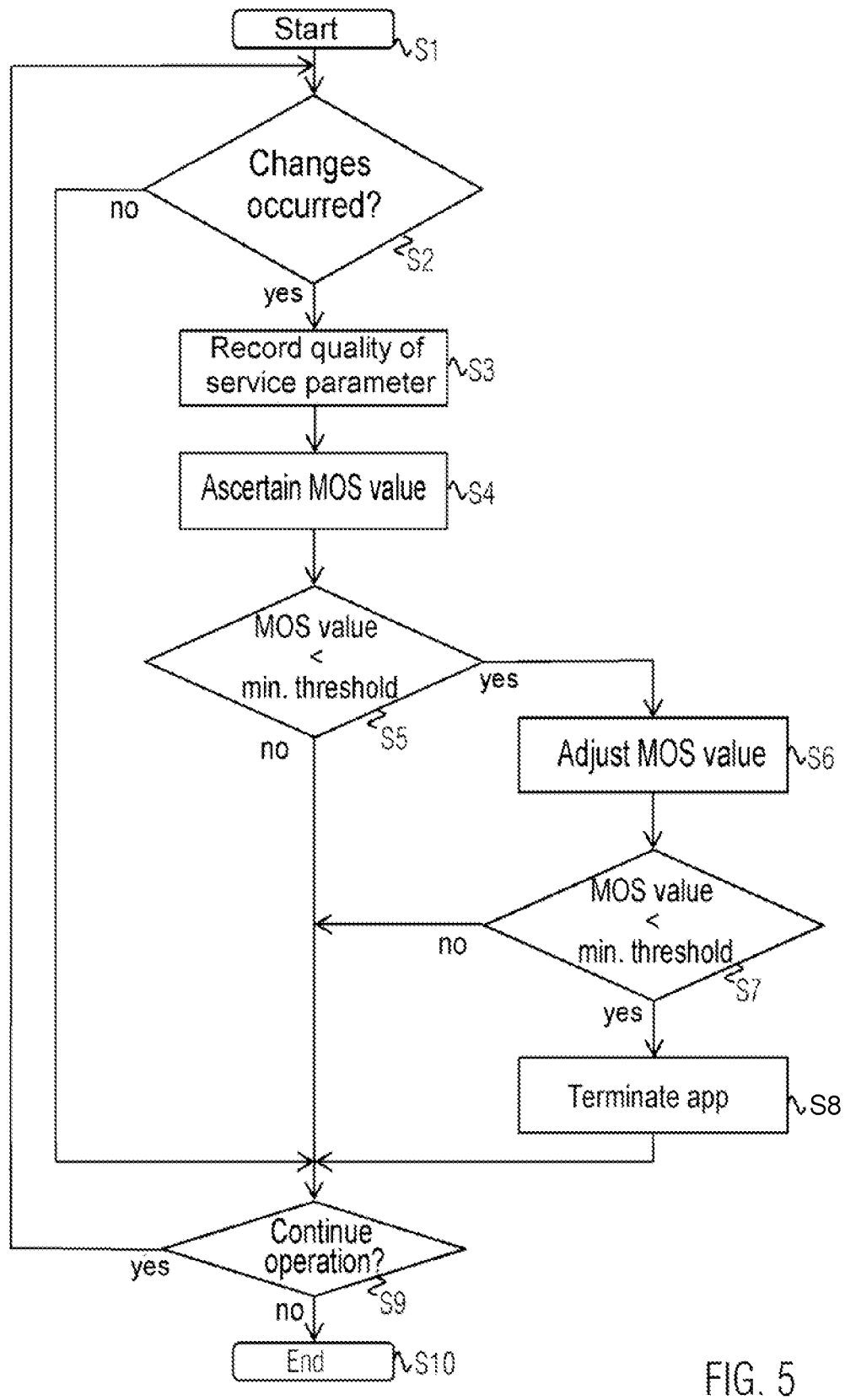
FIG. 5 is a flowchart of a method for monitoring a quality of service for a data transmission via a data connection in a flowchart.

In the first exemplary embodiment of a method according to the invention (FIG. 5), an application 12 for streaming video files is monitored for whether it is operated with a desired quality of service. The relevant QoE model for this is shown in FIG. 4A.

The method begins with step S1.

In step S2, a check is performed to determine whether a change has occurred that influences the data connection that the application 12 uses to communicate with one of the transmission/reception devices. Such a change is startup of the application, a change in the available connection capacity or a change in the transmission mode as a result of a change of radio channel, for example. In step S2, all changes that influence the data connection are detected.

If such a change is established in step S2, the method sequence moves to step S3, in which the relevant quality of service parameter for determining the MOS value is recorded. In the present exemplary embodiment, the relevant quality of service parameter is the data rate GD of the data connection. For this purpose, the data rate GD is read from the application profile register (FIG. 2B) for the corresponding application 12.

The QoE model (FIG. 4A) is used to determine the MOS value for the recorded data rate that represents the user satisfaction value.

The ascertained MOS value is checked (step S5) to determine whether it fulfills the desired quality of service by comparing it at least with a minimum user satisfaction threshold. Preferably, the measured MOS value is also compared with the optimum MOS value.

The MOS values of the QoE model comply with the standard based on ITU P.800 SERIES P. For video streaming and audio streaming, a minimum user satisfaction threshold of 2 to 3 is appropriate. In the present exemplary embodiment, the user satisfaction threshold is 2.5.

If the measured MOS value is less than the minimum user satisfaction threshold or greater than the optimum MOS value, it is adjusted to suit the changed conditions (step S6). This involves the transmission mode being changed and/or the data rate for a small MOS value being increased, provided that there is sufficient free data rate. If sufficient data rate is available then the data rate of the data connection is increased to the optimum data rate, otherwise the available data rate is used to increase the data rate of the data connection.

For a measured MOS value above the optimum MOS value, the adjustment is effected by virtue of the data rate being reduced to the optimum data rate or the transmission mode being changed, so that the MOS value is in the range between the minimum user satisfaction threshold (=minimum MOS value) and the optimum MOS value at the existent data rate. There are transmission modes that are more demanding in terms of the data rate, but bring about better quality overall. As an example, the resolution of a video file is cited in this regard. With a low resolution, sufficient user satisfaction can be achieved at just a low data rate. For a higher resolution, the video image can be presented in correspondingly larger form, but with a correspondingly higher data rate being necessary in order to achieve the desired user satisfaction.

Next, a fresh check is performed (step S7) to determine whether the measured MOS value is below the minimum user satisfaction threshold.

If this is the case, the corresponding application 12 is terminated (step S8). Otherwise, the method sequence moves to step S9, in which a check is performed to determine whether operation is continued. The method sequence also moves to step S9 if no change is established in step S2 or an MOS value corresponding to the desired quality of service is established in step S5.

If step S9 establishes that operation is continued, the method sequence moves to step S2 again. Otherwise, it is terminated in step S10.

The first exemplary embodiment explained above (FIG. 5) shows the basics of the invention for monitoring quality of service. In this exemplary embodiment, just a single application 12 is monitored. This method can be carried out for a plurality of applications 12 in parallel. The adjustment of the MOS value can be carried out according to various criteria. Combined adjustment of the transmission mode and the connection capacity can take place. However, it is also possible to change first the transmission mode and then the connection capacity, or vice versa. Before or after adjustment, a check is at least performed to determine whether the desired quality of service is existent, i.e. whether the MOS value or user satisfaction value corresponds at least to the minimum user satisfaction threshold. Preferably, this also involves checking whether the MOS value is greater than the optimum MOS value and if need be performing adjustment to lower the MOS value to at least the level of the optimum MOS value.

The first exemplary embodiment can also be modified such that the quality of service of the plurality of applications 12 is monitored simultaneously. In this context, step S3 involves the quality of service parameters of a plurality of, in particular all, active dynamic applications 12 with a QoE model being read, and step S4 involves the respective MOS values being ascertained. This can be carried out synchronously, i.e. steps S3 and S4 are carried out more or less simultaneously for all applications with a QoE model. When carried out asynchronously, the entire method (step S1 to step S10) is carried out in parallel, with the MOS values of the individual applications being able to be ascertained at staggered times in relation to one another.

In step S5, a check is performed to determine whether all the ascertained MOS values satisfy the desired criterion for connection quality. If a single data connection does not satisfy these criteria, the method sequence moves to step S6, in which the transmission modes and/or connection capacities are adjusted. This adjustment preferably takes account of the connection modes and/or connection capacities of all data connections. For this purpose, the total minimum connection capacity $Vk_{mintotal}$ and the total optimum connection capacity $Vk_{opttotal}$ are computed in accordance with the formulae indicated above, for example, and adjusted in accordance with the total available connection capacity. As a result, simultaneously with the monitoring of the qualities of service, the connection capacities are distributed to the individual active applications 12 of the mobile radio device 1 in a manner optimized using the QoE models.

The exemplary embodiments explained above are implemented on a mobile radio device 1, with the qualities of service (MOS values or user satisfaction values) of the data connections of all active dynamic applications 12 with a QoE model in the mobile radio device being monitored and being adjusted as appropriate.

In principle, it is also possible for at least some of these methods to be carried out on the radio system control server 15, which is connected to a multiplicity of mobile radio devices 1 via a radio network. In this case, the active dynamic applications 12 with a QoE model are either monitored individually or all active applications 12 of all mobile radio devices 1 need to be taken into account when adjusting the transmission modes and/or the connection capacities. The latter may be difficult and almost impossible to perform with a feasible computation complexity when there are a large number of mobile radio devices 1 and an accompanying even greater number of applications 12, since in practice there are always changes and it is then always necessary to record all connection modes and connection capacities of all data connections.

Figure 6:
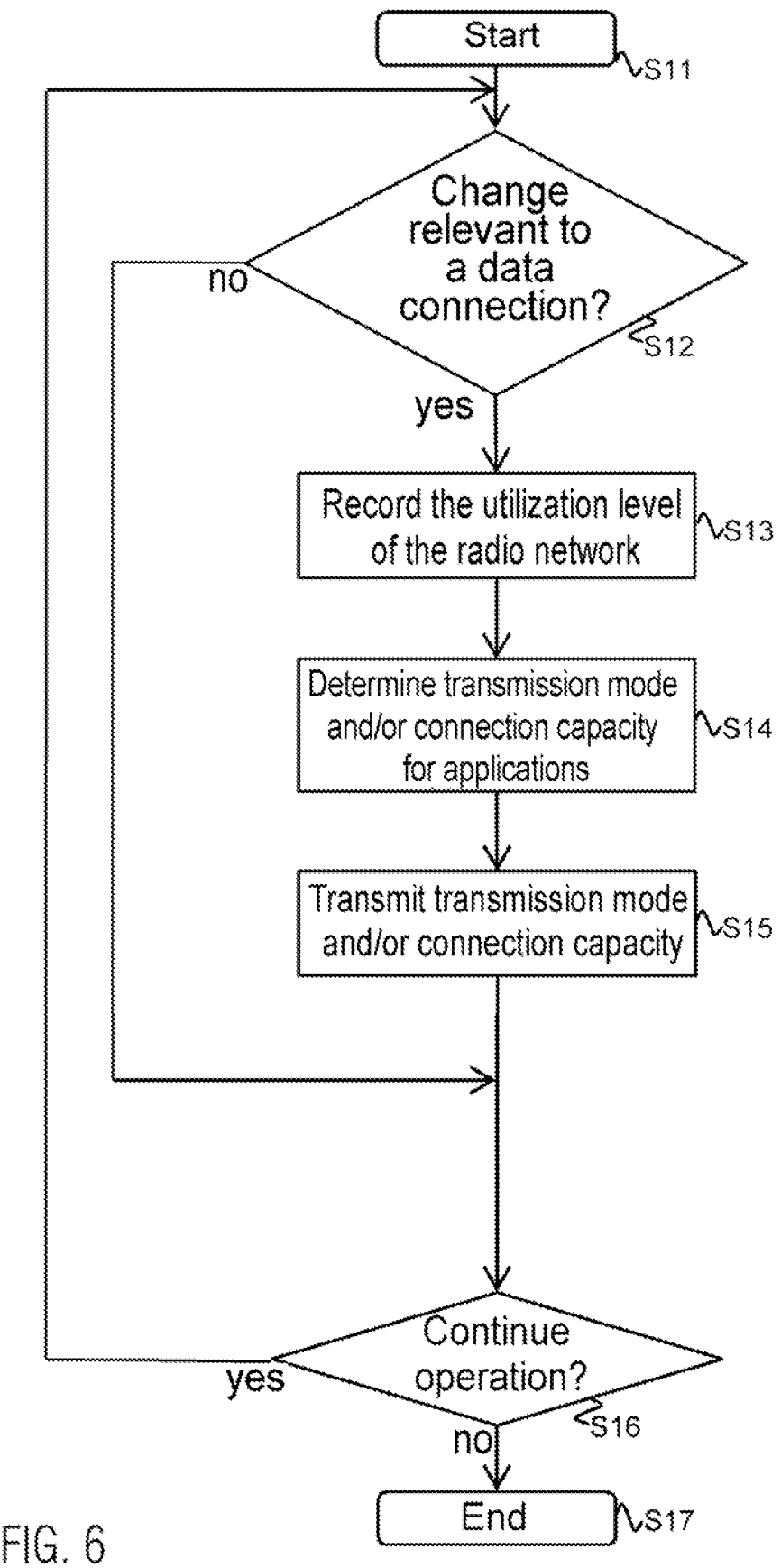
FIG. 6 is a flowchart of a method for setting qualities of service for a plurality of data connections in a flowchart.

A method according to a second exemplary embodiment (FIG. 6) is provided for the purpose of setting the quality of service of a multiplicity of dynamic applications 12 with a QoE model on the radio system control server 15.

This method begins with step S11.

In step S12, a check is performed to determine whether there is a change relevant to a data connection of an application 12 with a QoE model. Such a change is startup of the application 12, a change in the available connection capacity or a change in the transmission mode as a result of a change of radio channel, for example. In step S12, all changes that influence the data connection are detected.

If there is such a change, the utilization level of the radio network is recorded (step S13). This utilization level indicates the total utilization level of the radio network without this being broken down according to individual radio channels or data connections. This utilization level is simple to establish and is recorded regularly in a radio network in principle.

On the basis of this utilization level, the transmission mode and/or the connection capacity is determined (step S14), taking account of the respective QoE model, for the application for whose data connection a change has been established in step S13. The higher the utilization level of the radio network, the less data connection capacity there is available for each individual application 12. The higher the utilization level of the radio network, the smaller the setting for the MOS value and the less demanding, in terms of connection capacity, a mode of operation is selected. If the utilization level of the radio network is low, an optimum connection capacity is preferably set and a mode of operation that allows a high quality of data reproduction is chosen. With a high utilization level, the MOS value is set such that it corresponds at least to the minimum user satisfaction threshold. If this is not possible, the application 12 is terminated.

The mode of operation ascertained in this manner and/or the connection capacity ascertained in this manner are transmitted to the corresponding mobile radio device 1 (step S15). At the mobile radio device, the communication organization module 13 sets the data connection for the application 12 in accordance with the specifications by the radio system control server 15.

The mode of operation and/or the connection capacity can be transmitted as a particular operating point from the radio system control server 15 to the mobile radio device 1, with the communication organization module 13 either setting this operating point exactly or providing this operating point with a certain fuzziness, so that the operating point prescribes a setting range. Instead of the operating point, the radio system control server 15 can also transmit an operating range to the mobile radio device 1.

In step S16, a check is performed to determine whether operation is meant to be continued. If this is the case, the method sequence moves to step S12 again. If this is not the case, the method is terminated in step S17. If step S12 establishes that there is no change, the method sequence moves to step S16.

In this method, the modes of operation and the connection capacities of the individual dynamic applications 12 with a QoE model are set independently of one another. The adjustment is performed in accordance with the utilization level of the radio network, which utilization level is simple to ascertain at the radio system control server 15. Determination of the operating point or operating range for a particular application 12 is therefore effected independently of the other applications 12 and can be carried out with little computation complexity. Nevertheless, by taking account of the utilization level of the radio network, an operating point or operating range that is optimized for all active applications 12 of the radio network is obtained.

In this exemplary embodiment, the QoE models for the individual applications 12 are stored centrally on the radio system control server 15 or another server connected to the radio system control memory 16.

The determination of the operating point or operating range is carried out essentially on the radio system control server 15. In principle, however, it is also possible for the determination of the operating point or operating range to be carried out on the mobile radio device, in which case the utilization level of the radio network is made available to the mobile radio device by the radio system control server 15.

The exemplary embodiments explained above involve the use of QoE models (FIGS. 4A-4C) whose quality of service parameter is the data rate. Instead of the data rate, it is also possible to use other quality of service parameters, such as latency or error rate. However, the MOS value or user satisfaction value may also be dependent on a plurality of quality of service parameters. The QoE model is then a multidimensional function. In order to be able to determine the MOS value or user satisfaction value, such a QoE model first of all requires the plurality of quality of service parameters to be recorded.

In the case of the second exemplary embodiment (FIG. 6), connection capacities are assigned to the dynamic applications 12 with a QoE model centrally by the radio system control server 15 using the operating points or operating ranges. According to a further aspect, which is an independent invention, the connection capacity of the radio network can be distributed centrally for particular groups of applications 12 or all applications 12. In this case, the method according to the second exemplary embodiment is modified such that an operating point or operating range is assigned not only to the dynamic applications 12 with a QoE model but also to the other dynamic applications 12. In the case of dynamic applications 12 with a QoE model, the operating point or operating range is determined preferably but not necessarily using the QoE model. The central distribution of the connection capacities can also be used for a central decision regarding which applications 12, including static applications 12, are terminated at a high utilization level of the radio network, with the decision about termination of the individual applications being made preferably on the basis of the priorities, as in the case of the exemplary embodiments explained above.

The invention can be briefly summarized as follows. The invention relates to a method and an apparatus for monitoring or setting a quality of service for a data transmission via a data connection that is formed between at least one application, which can be carried out on an appliance that is situated on a mobile communication device, and a transmission/reception device that is connected to the mobile communication device by way of at least one radio channel. The quality of service can be altered by setting appropriate quality of service parameters, such as the connection capacity, and by setting a data transmission mode. The quality of service is altered or set such that a corresponding user satisfaction value corresponds at least to a minimum user satisfaction threshold. The quality of service can be monitored by recording an appropriate quality of service parameter and computing the user satisfaction value therefrom. The quality of service can also be set in accordance with the utilization level of the relevant radio network.

LIST OF REFERENCE SIGNS 1 mobile radio device
2 central communication unit
3 connecting module
4 antenna 5 external communication partner
6 transmission/reception device
7 data network (Internet)
8 connecting module manager
9 appliance
10 data network
11 switch
12 application
13 communication organization module
14 internal data memory
15 radio system control server
16 radio system control memory The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring a quality of service for a data transmission via a data connection between at least one application executed on a mobile device and a transmission/reception device connected to the mobile device by at least one radio channel over which the data connection is established, the method comprising the acts of:
    storing a quality-of-experience model correlating user satisfaction values and a connection capacity of the data connection between the at least one application and the transmission/reception device;
    recording a connection capacity value, wherein the connection capacity value is a value of the connection capacity of the data connection between the at least one application and the transmission/reception device;
    ascertaining a user satisfaction value for the data connection based on the quality-of-experience model and the recorded connection capacity value;
    determining that the user satisfaction value is below a minimum user satisfaction threshold, and whether it is possible to change a data transmission mode and/or the connection capacity of the data connection of the application such that the connection capacity value corresponds at least to the minimum user satisfaction threshold;
    changing a data transmission mode and/or the connection capacity of the data connection of the application such that the connection capacity value corresponds at least to the minimum user satisfaction threshold, when it is determined that the change is possible; and
    terminating, by the mobile device, the at least one application when it is determined that the change is not possible.

2. The method according to claim 1, wherein the connection capacity comprises one or more of a data rate, a latency, or an error rate of the data connection.

3. The method according to claim 1, wherein changing the data transmission mode comprises:
    for a video transmission, changing a video codec, a compression parameter including a quantization parameter, a frame rate, or a resolution;
    for an audio stream transmission, changing a source data rate or a bit rate;
    for a telephone call transmission, changing a voice codec; and
    for a file transmission, changing a compression rate.

4. The method according to claim 2, wherein changing the data transmission mode comprises:
    for a video transmission, changing a video codec, a compression parameter including a quantization parameter, a frame rate, or a resolution;
    for an audio stream transmission, changing a source data rate or a bit rate;
    for a telephone call transmission, changing a voice codec; and
    for a file transmission, changing a compression rate.

5. The method according to claim 1, wherein the method is carried out in at least one of a mobile communication device or a radio system control server connected to the transmission/reception device.

6. The method according to claim 4, wherein the method is carried out in at least one of a mobile communication device or a radio system control server connected to the transmission/reception device.

7. A method for setting a quality of service for a data transmission via a data connection in a radio network, which data connection is between at least one application executed on a mobile device and a transmission/reception device connected to the mobile device by at least one radio channel over which the data connection is established, the method comprising the acts of:
    storing a quality-of-experience model correlating user satisfaction values and a connection capacity for the data connection between the at least one application and the transmission/reception device;
    recording a utilization level of the radio network;
    determining a transmission mode and/or the connection capacity for the data connection based on the quality-of-experience model and the recorded utilization level, such that the user satisfaction value corresponds at least to a minimum user satisfaction threshold, when possible, and, when not possible, setting the connection capacity to "0" in order to terminate the application; and
    transmitting the transmission mode and/or the connection capacity to the mobile communication device for appropriate setting of the data connection.

8. The method according to claim 7, wherein the quality of service of a plurality of applications is set, with the plurality of applications being in a distributed arrangement over a plurality of communication devices.

9. The method according to claim 1, wherein the respective quality of service of a plurality of data connections is monitored or set for a respective application.

10. The method according to claim 1, wherein changing or setting the data transmission mode and/or the connection capacity is carried out so that the user satisfaction is in a range between a minimum user satisfaction threshold and an optimum user satisfaction value.

11. The method according to claim 10, wherein the user satisfaction values of all applications are approximately at a uniform distance from the respective minimum user satisfaction threshold and the optimum user satisfaction value.

12. The method according to claim 1, wherein a total connection capacity between the central communication device and the transmission/reception devices is distributed over the individual applications, with the transmission modes and/or connection capacities of the individual data connections of dynamic applications with the quality-of-experience model being set such that the user satisfaction value of each data connection is above the respective minimum user satisfaction threshold, and, if not possible, one or more applications are terminated.

13. The method according to claim 1, wherein in order to change the data transmission mode and/or the connection capacity of the data connection of the application, one or more values of quality of service parameters are transmitted to the application that define the changed data transmission mode and/or the changed connection capacity.

14. A method for controlling a quality of service for a data transmission via a data connection in a radio network, which data connection is between at least one application executed on a mobile communication device and a transmission/reception device connected to the mobile communication device via at least one radio channel over which the data connection is established, the method comprising the acts of:
storing a quality-of-experience model correlating user satisfaction values and a connection capacity of the data connection between the at least one application and the transmission/reception device;
recording a connection capacity value, wherein the connection capacity value is a value of the capacity of the data connection;
ascertaining a user satisfaction value for the data connection based on the quality-of-experience model and the recorded connection capacity value;
determining that the user satisfaction value is below a minimum user satisfaction threshold, and whether it is possible to change a data transmission mode and/or the connection capacity of the data connection of the application such that the connection capacity value corresponds at least to the minimum user satisfaction threshold;
changing a data transmission mode and/or the connection capacity of the data connection of the application such that the user satisfaction value corresponds at least to the minimum user satisfaction threshold, when it is determined that the change is possible; and
terminating, by the mobile communication device, the at least one application when it is determined that the change is not possible;
recording a utilization level of the radio network;
determining the data transmission mode and/or the connection capacity for the data connection based on the quality-of-experience model the recorded utilization level, such that the user satisfaction value corresponds at least to a minimum user satisfaction threshold, when possible, and, when not possible, setting the connection capacity to "0" in order to terminate the application; and
transmitting the transmission mode and/or the connection capacity to the mobile communication device for appropriate setting of the data connection.

15. A mobile radio device, comprising:
at least one connecting module for setting up at least one wireless data connection between at least one application executed by the mobile radio device and at least one transmission/reception device situated outside the mobile radio device,
wherein the mobile radio device is, with respect to the at least one data connection and/or a data transmission via the at least one data connection, configured to:
store a quality-of-experience model correlating user satisfaction values and a data connection capacity of the data connection between the mobile radio device and the at least one transmission/reception device;
record a connection capacity value, wherein the connection capacity value is a value of the capacity of the data connection;
ascertain a user satisfaction value for the data connection based on the quality-of-experience model and the connection capacity value; and
determine that the user satisfaction value is below a minimum user satisfaction threshold, and whether it is possible to change a data transmission mode and/or the connection capacity of the data connection of the application such that the connection capacity value corresponds at least to the minimum user satisfaction threshold;
change a data transmission mode and/or the connection capacity of the data connection such that the user satisfaction corresponds at least to the minimum user satisfaction threshold, when it is determined that the change is possible; and
terminate the at least one application when it is determined that the change is not possible.

16. The mobile radio device according to claim 15, wherein the mobile radio device is further configured to executed a method to:
record a utilization level of the radio network;
determine the transmission mode and/or the connection capacity for the data connection based on the quality-of-experience model the recorded utilization level, such that the user satisfaction value corresponds at least to a minimum user satisfaction threshold, when possible, and, when not possible, set the connection capacity to "0" in order to terminate the application; and
transmit the transmission mode and/or the connection capacity to the mobile communication device for appropriate setting of the data connection.

\* \* \* \* \*